Nov. 2, 1965     E. R. ARIESSOHN ETAL     3,215,823
PICTORIAL POSITION DISPLAY AND COURSE LINE COMPUTER
Filed July 17, 1962     8 Sheets-Sheet 1
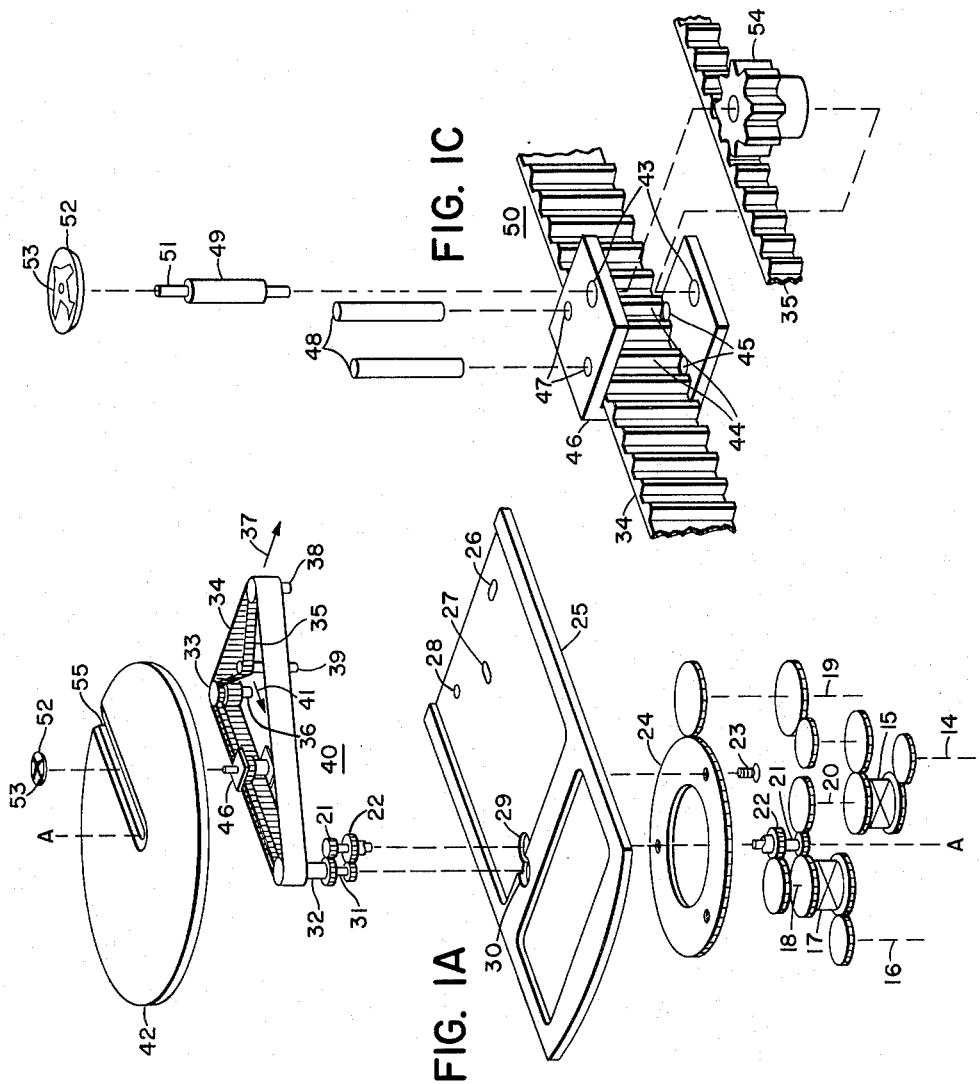
INVENTOR.
BY

INVENTOR.
BY

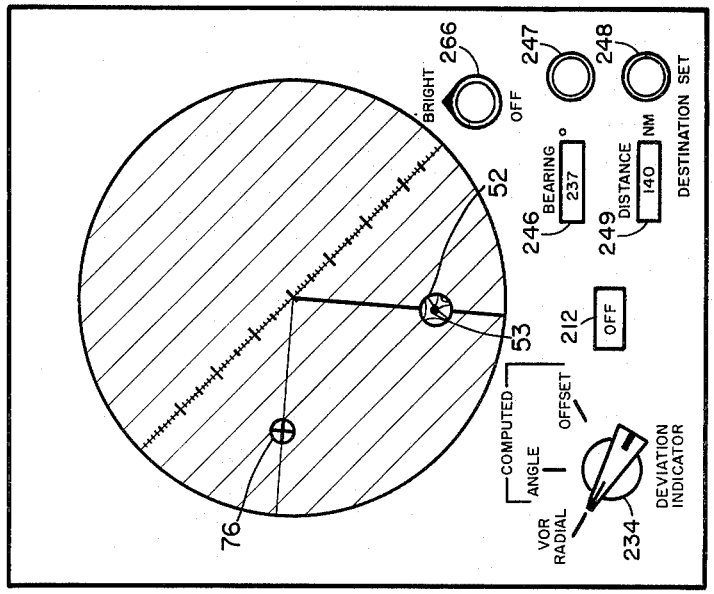
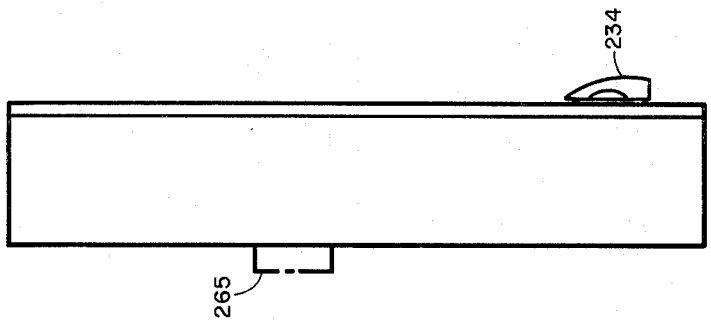

3,215,823
PICTORIAL POSITION DISPLAY AND COURSE
LINE COMPUTER
Edmond R. Ariessohn, Northvale, Henry A. Hammerstein, Dumont, and George W. Shepherd, Jr., Fair Lawn, N.J., assignors to ACF Industries Incorporated, New York, N.Y., a corporation of New York
Filed July 17, 1962, Ser. No. 210,522
27 Claims. (Cl. 235—187)

This invention relates to navigational computers and more particularly to the type used in conjunction with a visual display carried in an aircraft to display present aircraft position and heading on a special airways map and to provide continuous course information to a way point or destination.

The present invention is an improvement of the pictorial positional display navigational systems disclosed in two pending applications, Serial No. 57,536 of George W. Shepherd, Jr. and Henry A. Hammerstein filed September 21, 1960, which issued September 29, 1964 as Patent No. 3,151,310, and Serial No. 95,139 of Edmond R. Ariessohn, Henry A. Hammerstein and George W. Shepherd, Jr. filed March 13, 1961, both applications having been assigned to the same assignee as is this application. This invention provides particularly an additional visual indication of the way point or destination relative to the map of the territory over which the aircraft is flying, which may be selected and set in at will. In so doing, counters are actuated which indicate the coordinates of the way point or destination with reference to the VORTAC ground station at the center of the map. If the destination is beyond the limits of the map, the counters are still used to set up the co-ordinates of the destination with respect to the ground station. As an additional particular improvement, a so-called course line computer is incorporated which provides an instrument indication of angular or offset error between the aircraft's present bearing to the way point or destination and the originally planned or predetermined course and also provides an instrument indication of the aircraft's distance to go to the selected way point or destination. Angular error is the deviation between the magnetic bearing of the predetermined course and the magnetic bearing of the aircraft's present course, while offset error would occur in the situation where the aircraft is presently flying a course parallel to the predetermined course but displaced from it by some so-called "offset" amount.

The two prior applications mentioned above briefly described the Federal Aviation Agency (FAA) airways system under which the use of pictorial navigational displays was advantageous particularly in that they avoid the ordinary limitation of receiving precise navigational guidance only when proceeding along selected radials from ground stations. They also pointed out the additional economic advantage of the inventions which were the subject of those applications in that they receive their operational information by tieing in to conventional navigational instruments carried in an aircraft, rather than requiring expensive additional navigational instruments to furnish compatible positional information. The present invention also encompasses these advantages.

However, the inventions of the previous applications as well as similar prior art instruments provide position data which are directly related to the position of a VORTAC or some other type transmitting or transponding stations. Therefore unless the selected destination or way point was of this type, say containing a DMET facility, the pilot would have to employ some mathematical method of computing the distance from the aircraft's present position to the destination or way point as the case may be. The distance to go to the destination is required to facilitate accurate time of arrival and fuel consumption estimates. To avoid traffic or storms or for other reasons, a pilot may desire to change his course to fly parallel to and at an offset distance from a previously determined course. An instrument indication of a constant offset from a selected course would be a great help to a pilot in flying such an offset course. It would provide him with a uniform signal signifying deviation from a selected flight path independent of his position from the ground station. This would allow standard correction maneuvers to zero the indicator and to improve accuracy of flight, due to the fact that the indicator sensitivity could be set to be always a maximum for the particular distance from the station or way point.

With a course line computer feeding destination information into the conventional flight instruments carried by the aircraft, the effect would be to permit a pilot to select an arbitrary way point or destination and to interpret his flight instruments as though the destination were a VORTAC station.

It is also an object of this invention to provide an improved pictorial position display.

It is another object of this invention to provide a pictorial position display which shows aircraft's own position and heading plus the position of an arbitrarily selected way point or destination in such a manner that virtually no parallax is introduced between the two symbols of positions and the map.

It is still another object to provide automatic scale switching for both aircraft position and destination indicators.

It is a further object to provide an improved course line computer.

It is a still further object to provide an improved course line computer for solving the problem of bearing and distance to an arbitrarily selected way point or destination, using bearing and distance information of the aircraft relative to a known station.

It is an additional object to provide a course line computer to provide angular or distance offset of a vehicle from a predetermined course to an arbitrarily selected way point or destination.

It is a feature of this invention that it provides an inexpensive and compact course line computer that may be operated in conjunction with a pictorial position display and with existing cockpit instrumentation.

These and additional objects and features are accomplished in the present invention by a compactly packaged combination of a course line computer and a rho-theta type of display, where the reticle distance "rho" from a central reference point corresponds to aircraft range from a station and the reticle's angular position from a central axis through the reference point corresponds to angular bearing "theta" of the aircraft from the station. Two servo systems actuated by bearing and range signals received from a reference VORTAC station to which the aircraft's DMET and VOR receivers are tuned position a rotatably mounted aircraft marker with respect to a scaled map of the territory over which the aircraft is flying, so that the marker's map position corresponds to the aircraft's actual position. Maps are keyed to various VORTAC stations and are oriented on the display with Magnetic North up. Maps are prepared and inserted so that the position of the VORTAC station to which the receivers are tuned is located over the central axis of the display. This axis is the center of co-ordinates of the rho-theta system. Maps of different scales carry different tabs which trip corresponding range setting switches, so that the positions of the aircraft marker and destination symbol correspond to the scale of the map which is inserted.

The aircraft marker of the display is also servoed in response to signals from the aircraft's compass, to show the aircraft's actual Heading with respect to Magnetic North.

The display features a circular transparent course selector disc rotationally mounted above the map and having a series of parallel course lines which can be rotated to extend the lines across the map parallel to the direction of any desired course, thereby assuring the pilot that he is flying in the correct direction when the aircraft marker moves parallel to a course line. The course selector also incorporates scaled graduations so that the pilot can estimate distances on the display, knowing the scale of the particular map being used.

The course line computer solves the problem of bearing and distance to the destination or way point relative to the aircraft's position, from four inputs: aircraft's range and bearing relative to the VORTAC station (obtained from the radio receivers) and destination range and bearing relative to the VORTAC station (manually fed into the display). It obtains the solution by resolving these signals into rectangular components of distance, subtracting corresponding components, obtaining a resultant stator space field representative of the distance between aircraft and destination (by feeding the two difference components into the stator windings of a resolver) and then reading out the distance signal on one of the rotor windings after servoing that rotor winding into alignment with the stator space field. The angular displacement through which the rotor turns corresponds to the destination Bearing relative to the aircraft.

The computer also provides a continuous instrument indication of the direction and magnitude of any deviation from a predetermined course by means of another resolver system in which a predetermined course is set into the resolver, and the angular displacement obtained from the previous servo system, which is representative of destination bearing, is subtracted from it to give the deviation. The regular flight instruments carried by the aircraft to indicate deviations from the selected VOR radial flight path that the aircraft would otherwise normally be flying are used to indicate the deviation from a pre-selected course which is not necessarily a VOR radial. This is done at the pilot's direction by switching off the VOR information and switching the computed deviation signal, just described, into the indicators.

Suitable voltage dividing means are provided in the computer to convert the deviation angle to give a constant indication when flying a constant parallel offset from a pre-selected course as explained above regardless of the angle to the destination.

FIGURES 1A and 1B are partially exploded perspective assembly drawings of the pictorial position display of the present invention.

FIGURE 1C is a partially exploded perspective drawing of the details of the aircraft marker assembly of FIGURE 1A.

FIGURES 7A and 7B are plan and elevation drawings of the instrument panel care of the present invention.

Figure 1B:
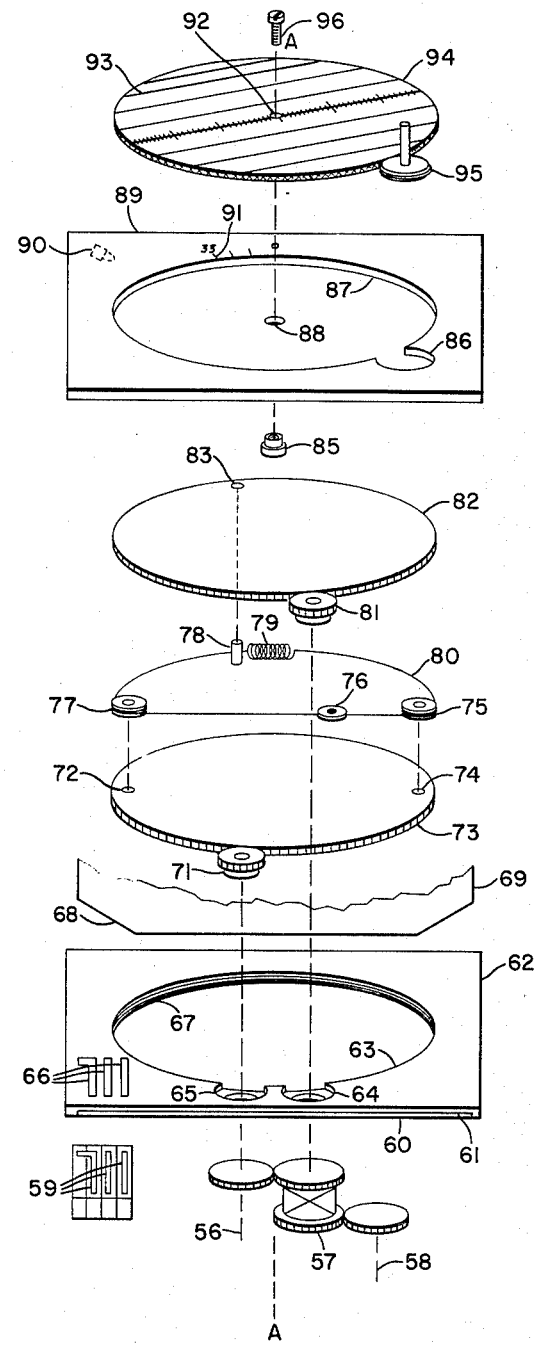

The pictorial position display in partially exploded form is illustrated in FIGURES 1A, 1B, and 1C.

The axis of rotation is the central reference axis A—A shown in FIGURES 1A and 1B. Rotatably mounted to the frame not shown but similar to that illustrated in FIGURE 2 of application Serial No. 95,139, and about reference axis A—A is bearing plate 25, which rotates with hollow gear 24 to which it is fastened as by screws 23. Hollow gear 24 is driven by the aircraft bearing servo system remote shaft 19, through an angle such that the position of bearing plate 25 with respect to the Magnetic North axis of the display corresponds to the actual Magnetic Bearing of the aircraft with respect to the VORTAC station to which the aircraft's radio receiver is tuned. In the drawings of FIGURES 1A and 1B, the Magnetic North axis of the display would be through and perpendicular to reference axis A—A, and into the plane of the paper.

As bearing plate 25 rotates, it causes belt drive assembly 40 to rotate with it. Belt drive assembly 40 consists of range belt 34 and heading belt 35 and associated mounting members. Range belt 34 is translatably mounted on bearing plate 25 by means of double ended gear 32, idler wheel 36 and tension wheel assembly 38. Heading belt 35 is translatably mounted on bearing plate 25 in a similar manner by means of double-ended gear 31, idler wheel 33, tension wheel assembly 38, and tension cylinder 39. In FIGURE 1A, tension wheel 33 is shown mounted concentrically within tension wheel 36 on a common shaft in hole 28 in bearing plate 25. Both tension wheel 33 and tension wheel 36 are free to rotate independently of each other in a suitable manner as they are driven by their respective belts. The diameter of tension wheel 36 which contacts range belt 34 is larger than the diameter of tension wheel 33 which contacts heading belt 35. This spaces range belt 34 outside of heading belt 35. Tension wheel 33 is capped to retain heading belt 35 in the proper vertical position.

The construction of the tops of double ended gears 31 and 32 in FIGURE 1A as well as of the tops of the corresponding parts of tension wheel assembly 38 is similar to the construction of tension wheels 33 and 36. Double ended gears 31 and 32 are both rotatably mounted to bearing plate 25 in hole 30. The shaft of double-ended gear 31 is mounted concentrically and within the hollow shaft of double-ended gear 32 as shown. The clearances involved are such that double-ended gears 31 and 32 are free to rotate independently of each other. Similarly the diameter of tension wheel assembly 38 that contacts range belt 34 is free to rotate independently of the diameter that contacts heading belt 35. Tension wheel assembly 38 is mounted in elongated hole 26 in bearing plate 25. Tension wheel assembly 38 may be positioned and adjusted in a suitable manner not shown to exert tension on range belt 34 and heading belt 35 in the direction shown by arrow 37. Tension cylinder 39 is mounted in elongated hole 27 in bearing plate 25 and is also adjusted in a suitable manner not shown to exert tension on heading belt 35 in the direction shown by arrow 41.

Aircraft marker assembly 50 is shown in partially exploded form in FIGURE 1C. Bracket 46 is held in position against range belt 34 by two pins 48 fitting into holes 47 in the bracket and serrations 44 in the range belt to clamp the belt against the bracket. Pinion 54 is fixed to the large diameter of shaft 49 which is rotatably mounted in holes 43 in bracket 46. Aircraft marker disc 52 bears a representation of an aircraft 53 in which the fore and aft axis of the aircraft marker 53 is representative of aircraft heading. The disposition of pins 48, heading belt 35, shaft 49, and pinion 54 is such that heading belt 35 is urged against pinion 54 with sufficient force to rotate the pinion as the heading belt translates, but the pins slide past the heading belt 35 without causing heading belt translation when range belt 34 translates.

Double ended gears 21 and 22 are rotatably mounted to the frame in a suitable manner not shown concentric with each other and with reference axis A—A. Double ended gear 22 rotates independently of and about the shaft of double ended gear 21 as shown. The disposition of double ended gears 21 and 22 and belt drive assembly 40 is such that the traverse of the span of range belt 34 carrying bracket 46 causes the center of aircraft marker 53 to move directly over reference axis A—A. This is accomplished by offsetting double ended gears 31 and 32 and tension wheels 33 and 36 from reference axis A—A and compensating for this offset by offsetting shaft 49 from range belt 34 in the opposite direction.

Lighting disc 42 is fixed to rotate with bearing plate 25 in a suitable manner as by screws not shown. Lighting disc 42 has a radial slot 55 cut in it to allow passage of the elongated portion 51 of shaft 49 when range belt 34 translates. The top of slot 55 is tapered to allow motion of aircraft marker disc 52. Lighting disc 42 is made from some light-conducting material such as methyl methacrylate to serve as a light diffusing plate. Its lower surface is treated in a suitable manner to make the lighting disc opaque and reflect the light upwards and insure that the mechanism below is not visible to the observer. In the preferred embodiment it is covered with white paint.

The drive mechanism for the aircraft marker 53 will now be described.

The aircraft bearing servo system remote shaft 19 drives hollow gear 24 which in turn rotates bearing plate 25, belt drive assembly 40, aircraft marker assembly 50 and lighting disc 42 through an angle $\theta$ about central axis A—A corresponding to the input signal to the bearing servo.

The rotation of bearing plate 25 together with double ended gears 32 and 31 mounted on the bearing plate and meshed with gears 21 and 22 must not cause translation of range belt 34 and heading belt 35. To accomplish this, the aircraft bearing servo system remote shaft 19 provides a compensating drive through differential gear assembly 15 which in turn drives double ended gear 32 through double ended gear 21 and drives double ended gear 31 through differential 17 and double ended gear 22.

The aircraft range servo system remote shaft 14 drives differential gear assembly 15, output shaft 20, double ended gear 21, double ended gear 32 and a range belt 34 carrying the aircraft marker 53 a radial distance with respect to reference axis A—A corresponding to the input signal to the range servo. The range servo system is zeroed with the center of aircraft marker 53 over reference axis A—A. The translation of range belt 34 also translates bracket 46 and pinion 54. Since heading belt 35 would normally be stationary in the absence of a changed signal to the aircraft heading servo, pinion 54 which is meshed with heading belt 35 would tend to rotate when belt 34 is translated, causing an erroneous indication of heading by aircraft marker 53. To prevent such erroneous indication, remote shaft 14 also drives heading belt 35 through differential 15, output shaft 20, double ended gear 21, differential 17, output shaft 18, double ended gear 22, and double ended gear 31 in a direction to compensate for this motion and maintain aircraft marker 53 in its original orientation with respect to north, independent of rotation of bearing plate 25 or of translation of range belt 34.

The aircraft heading servo system remote shaft 16 drives differential assembly 17, shaft 18, double ended gears 22 and 31 and heading belt 35 causing rotation of pinion 54 and aircraft marker 53 through an angle, about the axis through the center of aircraft marker 53, corresponding to the signal to the aircraft heading servo. The heading servo system is zeroed for the fore-aft axis of the aircraft marker 53 parallel to the Magnetic North axis of the display.

Gear plate 62 is fastened to the frame in a plane perpendicular to reference axis A—A so that the central hole 63 in the gear plate is centrally located about axis A—A. Gear plate 62 has a slot 61 at the bottom covered with bottom plate 60 fastened to gear plate 62. Lighting disc 42 fits rotatably in alignment with the aperture in bottom plate 60, also centrally located about reference axis A—A. Micro switch actuators 59 extend into apertures 66 in gear plate 62 to actuate the poles of the map range switches such as 18 and 19 shown in FIGURE 1 of application Serial No. 95,139 when the microswitch actuators are depressed by contact with mitered surface 68 of map 69. The scale map and scale changing circuitry are described in application Serial No. 95,139.

A pair of methyl methacrylate or other transparent disc gears 73 and 82 are rotatably and coaxially mounted in central hole 63 above the shoulder 67 in gear plate 62. Both gears 73 and 82 have external teeth. Destination bearing gear 73 is coupled to drive pinion 71. Destination distance gear 82 is coupled to drive pinion 81. Gear plate 62 is provided with openings or wells 64 and 65 for receiving pinions 81 and 71 respectively. Destination bearing gear 73 has pulley 75 and 77 mounted in holes 74 and 72 respectively for partially supporting a loop of string or belt 80 to which is fastened a flight destination indicator or reticle 76. The pulleys 75 and 77 are positioned so that the string 80 carrying the destination indicator 76 extends diametrically across the center of destination bearing gear 73. The string preferably includes a tensioning spring 79. One point of the string 80 is fastened to destination bearing gear 82 as by pin 78 mounted in hole 83 in gear 82.

The destination bearing servo system remote shaft 56 drives pinion 71 to rotate destination bearing gear 73 through an angle corresponding to the input signal to the destination bearing servo.

The destination distance servo system remote shaft 58 drives the destination distance gear 82 through differential 57 and pinion 81, by an amount corresponding to the input signal to the distance servo. The destination distance servo is zeroed with the distance reticle 76 over reference axis A—A. In order to prevent destination reticle 76 from moving radially with respect to reference axis A—A as destination bearing gear 73 rotates and thereby introducing a range error into the system, the destination bearing servo system remote shaft 56 at the time it introduces a new destination bearing signal, also drives differential 57 a compensating amount so that the destination reticle 76 does not move radially.

Dial plate 89 is made from some light transparent material such as methyl methacrylate and is fastened to the frame in a plane perpendicular to reference axis A—A. It has a central recess 87 which is of shallow depth at the outer edge and increases slightly in depth toward the central hole 88. Around the periphery of central recess 87 and embedded in the dial plate and connected as described in Serial No. 57,536 are a number of incandescent lamps 90 of which only one is shown in FIGURE 1B. The tapered central section of plate 89 is to give a wedge lighting effect according to the well known properties of light pipes and is used to illuminate the components below plate 89 more brightly and uniformly so that transparent map 69, destination marker 76, and aircraft marker 53 are more readily visible to the observer.

Transparent cursor disc 94 also made from some light transparent material such as methyl methacrylate is rotatably fastened to dial plate 89 by a suitable means such as screw 96 through hole 88 into nut 85. The under surface of cursor disc 94 is likewise tapered to fit into central recess 87 but the top surface is flat and mounts in position perpendicular to reference axis A—A, so that it acts as a bar to reduce ambient light rays from lamps 90 passing up into the eyes of the observer. Marked on cursor disc 94 by engraving or painting or some other suitable method are a series of parallel course lines 93 which can be rotated manually by knob drum 95 to extend the lines 93 across map 69 parallel to the direction of any desired course, thereby assuring the pilot that he is flying in the correct direction when aircraft marker disc 52 moves parallel to a course line on cursor disc 94.

Figure 2A:
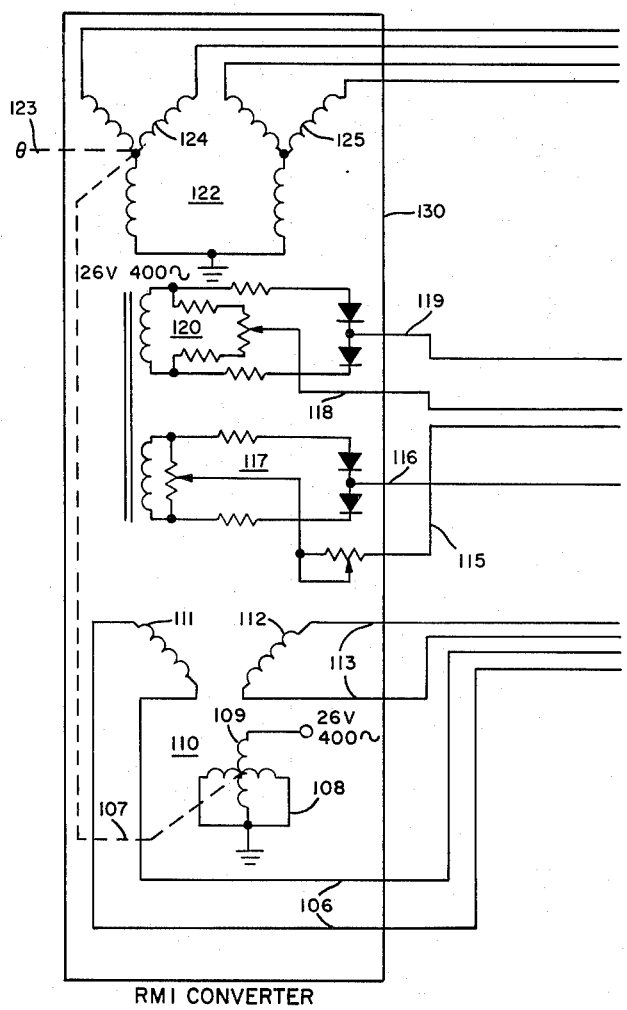
FIGURES 2A and 2B are diagrams showing the interconnections between various elements of the system.
Figure 2A:
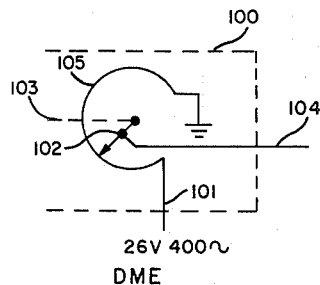
Figure 2B:
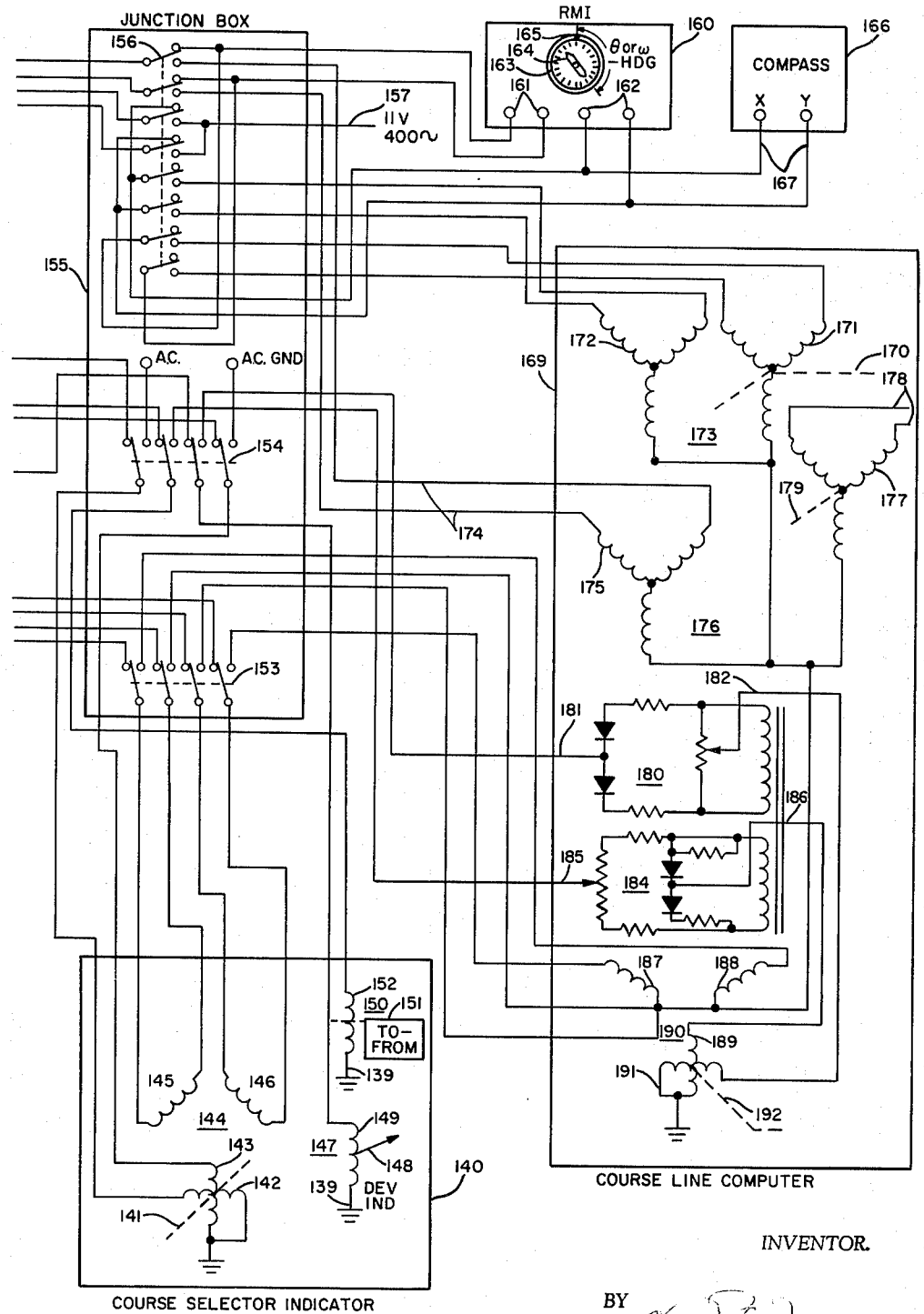

The present invention is adapted for use with conventional navigation instruments carried in an aircraft and in FIGURES 2A and 2B there is shown an interconnecting diagram tieing the Pictorial Position Display and Course Line Computer by means of Junction Box 155 into the pertinent flight instruments. These are the Radio Magnetic Indicator (RMI) Converter 130 of a VOR Receiving System such as the type 51R–4 manufactured by Collins Radio Company of Cedar Rapids, Iowa, and shown in FIGURE 2A, a Course Selector Indicator 140, such as the type 331 H–1 also manufactured by Collins and shown in FIGURE 2B, and RMI 160, such as the type 332C–2 manufactured by Collins and shown in FIGURE 2B, a conventional Gyro Compass 166, and a Distance Measuring Equipment TACAN (DME) 100 such as is manufactured by the Federal Division of International Telephone and Telegraph Company of Clifton, New Jersey.

RMI converter 130 includes an Omni Bearing Indicator (OBI) 122 having stator windings 125, rotor windings 124, and a rotor shaft 123, two demodulators 120 and 117 coupled to a 26 volt 400 cycle reference source; and a resolver 110 having two conjugate stator windings 111 and 112, two conjugate rotor windings 108 and 109, and a rotor shaft 107. The shafts of OBI 122 and Resolver 110 are tied together and are driven by a motor and servo system not shown.

Junction Box 155 is shown with the relay contactors in their normal position with the Pictorial Position Display and Course Line Computer out of the circuit and the flight instruments operating in their normal manner. In this mode of operation, Heading information from Compass 166 is fed to stator windings 125 of OBI 122, Bearing information $\theta$ from the aircraft's VOR receiver is applied to the shaft 123 of OBI 122 so that Bearing-Heading information appears on the rotor windings 124 of the OBI and is applied to input 161 of the synchro driving the double barred pointer 164 of RMI 160. Heading information from compass 166 is also applied to the input 162 of the servo motor driving the heading card 163 of RMI 160. The heading card 163 of RMI 160 therefore rotates until the Heading angle appears under the index mark 165 of the RMI and the double barred pointer 164 rotates through the Bearing-Heading angle from the RMI index 165, and therefore points to magnetic VOR Bearing $\theta$ on the azimuth card.

Rectified reference current passes out of demodulator 120 over connector 119 through a contactor of contactor set 154 of Junction Box 155, rotor coil 142 of resolver 144, the "To-From" coil 152 of "To-From" Indicator 150, another contactor of contactor set 154 and back over connector 118 to demodulator 120 to complete the circuit. Similarly recitified reference current passes out of demodulator 117 over connector 116, through a contactor of contactor set 154, through deviation indicator coil 149 of Deviation Indicator 147, through rotor winding 143 of resolver 144 through a fourth contactor of contactor set 154 and back over connector 115 to demodulator 117 to complete the circuit. "To-From" Indicator 150 and Deviation Indicator 147 are meter movements of the galvanometer type in which the direction on either side of center of "To-From" flag 151 and deviation needle 148 is determined by the direction of current through windings 152 and 147 respectively. The direction of current through these windings is determined by the positions of rotor windings 142 and 143 respectively of OBS 144.

A.C. reference voltage is applied to rotor coil 109 of resolver 110. The other quadrature wound rotor coil 108 is shorted out. This produces a rotatable space field whose position with respect to the stator windings 111 and 112 depends upon the position of rotor shaft 107 which is driven to a position corresponding to the Magnetic Bearing $\theta$ from the aircraft to the TACAN station due to the coupling of shafts 123 and 107. This space field orientation is transmitted by stator windings 111 and 112 of RMI converter resolver 110 over connector pairs 106 and 113 and through contactor set 153 of Junction Box 155 to stator windings 145 and 146 of Course Selector Indicator Resolver 144 also called Omni Selector (OBS). This produces a resultant stator space field in OBS resolver 144 also corresponding to $\theta$. As the rotor coils 142 and 143 of resolver 144 are manually rotated by an operator turning rotor shaft 141 to the desired course $\phi$, the resultant signal induced in the rotor windings 142 and 143 is proportional to th difference $\theta-\phi$. If the bearing $\theta$ coincides with $\phi$, the output of rotor winding 143 which is connected to the deviation indicator coil 149 is zero and the deviation indicator needle 148 remains centered. For this case the other rotor winding 142 connected to "To-From" coil 152 is in phase with the stator field of resolver 144 and its output is a fixed voltage which is fed to the "To-From" coil 152 to move the flag 151 to indicate "To" or "From" depending upon the position of the "To-From" switch on the OBS not shown. For deviations in $\theta$ from the selected course $\phi$, the output of Deviation Indicator 147 will read the sine of the deviation angle $\theta-\phi$ as rotor winding 143 of resolver 144 reads the sine of the resultant field. Similarly the output of the "To-From" Indicator is obtained from the cosine of the deviation angle, the signal obtained from rotor winding 142.

Figure 3:
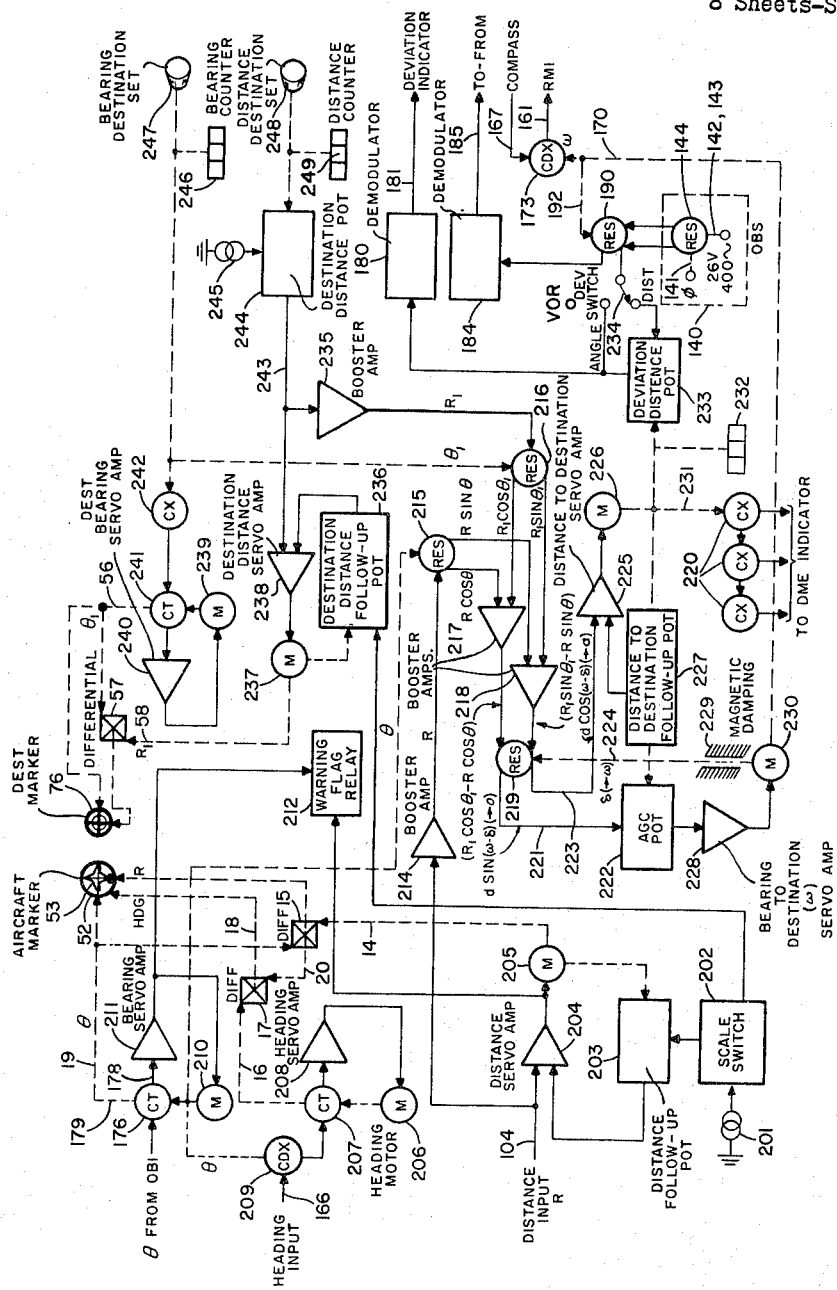
FIGURE 3 is a functional block diagram illustrating the servo systems which position the aircraft marker and destination marker of the pictorial position display and solve the computing problem of the course line computer of the present invention.

Considering FIGURES 2A and 2B with FIGURE 3, when the Pictorial Position Display and Course Line Computer is placed in operation with the aircraft's navigational instruments, the contactors take the position opposite from that shown in Junction Box 155.

The range signal input R is obtained from DME 100. The range signal R is in the form of angular position of shaft 103 which is coupled to arm 102 of grounded potentiometer 105 which is on DME 100. The position of arm 102 is converted to voltage in potentiometer 105 corresponding to range, and an electrical connection 104 from arm 102 is then made to a conventional servo amplifier system consisting of servo amplifier 204, range servo motor 205, distance follow-up potentiometer 203, voltage source 201, and scale switch 202, which drives remote shaft 14 to move aircraft marker 53 in range as described heretofore. The operation of scale switch 202 and and follow up potentiometer 203 is described in the explanation of FIGURE 1 of application Serial No. 95,139.

With the contactors of junction box 155 in the Display operating condition, OBI 122 has the leads of stator winding 125 disconnected from compass 166 and a voltage 157 representing zero Heading is applied to the stator leads through contactor set 156. The output of rotor windings 124 of OBI 122 is now in the form of Magnetic VOR Bearing $\theta$ and this is connected through contactor set 156 and leads 174 to the stator windings 175 of control transformer 176. The rotor 179 of control transformer 176 is coupled to remote shaft 19 and the leads 178 from the rotor windings 177 of control transformer 176 are connected to the input of servo amplifier 211. Control Transformer 176, Servo amplifier 211, and servo motor 210 comprise a conventional bearing servo system which drives remote shaft 19 to rotate bearing plate 25 and aircraft marker assembly 50 in Bearing about reference axis A—A as described heretofore. The error voltage across the rotor leads 178 of control transformer 176 is determined by the relative angular displacement between the position of rotor 179 and the shaft position in the OBI. The error voltage is amplified in servo amplifier 211 and fed to servo motor 210 which rotates remote shaft 19 to reduce the error voltage to zero.

The foregoing connections to conventional Bearing indicating equipment are described merely as examples and not to limit the application of the invention to particular indicators or instrumentation. Any navigational computer supplying Bearing information from a reference station may be employed by making suitable connections in a similar manner.

Heading information from compass 166 is also applied to the rotor windings of differential generator 209. In describing the aircraft Bearing servo system as it drives bearing plate 25 through an angle $\theta$ about reference axis A—A heretofore, it was stated that the purpose of the associated drive through differential assemblies 15 and 17 was to keep heading belt 35 and range belt 34 from translating when bearing plate 25 was rotated in Bearing. If the aircraft's Heading in space remains constant while its Bearing changes, then the fore-aft axis of aircraft marker 53 should remain constant with respect to the Magnetic North axis of the display, and as bearing plate 25 has changed direction by the change in Bearing, it is necessary to subtract the change in Bearing from the Heading input to maintain a true display representation of aircraft Heading. Accordingly, the rotor of differential generator 209 is also coupled to remote shaft 19 so the output of the stator windings of differential generator 209 is Heading-Bearing and this is applied to another conventional servo system comprising control transformer 207, servo amplifier 208, and servo motor 206 which drives remote shaft 16 to translate heading belt 35 and rotate aircraft marker 53 in Heading as described heretofore. The error voltage across the rotor leads of control transformer 207 is determined by the relative angular displacement between the position of the rotor of control transformer 207 and the stator field representative of Heading-Bearing.

The pilot sets his destination into the Display by manually rotating bearing destination set 247 and distance destination set 248 until destination marker 76 is over the map representation of the destination. Destination marker 76, bearing and distance destination sets 247 and 248 and the corresponding destination bearing servo system and destination distance servo systems are zeroed with destination marker 76 over reference axis A—A and destination bearing counter 246 and destination distance counter 249 geared to the corresponding sets showing zeros. In the present embodiment Bearing destination counter 246 has three digits and reads in degrees up to 360 degrees while distance destination counter 249 is a three digit decade counter reading in nautical miles.

Bearing destination set 247 is geared to the rotor shaft of synchro generator 242 and the stator windings of synchro generator 242 are connected to the stator windings of control transformer 241. Control transformer 241, servo amplifier 240, and servo motor 239 comprise a conventional destination Bearing servo system which positions remote shaft 56 according to the Bearing of the desired destination. The error voltage on the rotor windings of control transformer 241 which is the signal to servo amplifier 240 is determined by the relative displacement between the shaft of bearing destination set 247 and remote shaft 56.

Distance destination set 248 is geared to the movable arm of destination distance potentiometer 244 which operates in an exactly similar manner to DME potentiometer 105 described heretofore. The output of destination distance potentiometer 244 is nulled against the output of destination follow-up potentiometer 236 to become the signal to servo amplifier 238. Scale switch 202, destination distance follow-up potentiometer 236, destination distance potentiometer 244, servo amplifier 238, and servo motor 237 comprise a conventional destination distance servo amplifier system which operates in a similar manner to the aircraft marker range servo system including range potentiometer 105 described heretofore, and positions remote shaft 58 according to the distance from reference axis A—A to the map representation of the desired destination. The signal voltage to servo amplifier 238 is determined by the relative displacements between remote shaft 58 and the setting of destination distance potentiometer 244.

It should be noted that with servo systems intervening between the Bearing and distance destination sets 247 and 248, a destination which is beyond the limit of travel of destination marker 76, but whose co-ordinates are known may be set into the corresponding counters 246 and 249 of the computer. In such a case the two counters 246 and 249 would indicate the correct destination and the computer would give the correct results, but the destination marker 76 would stay at the edge of the map next to either pulley 75 or 77.

Figure 4:
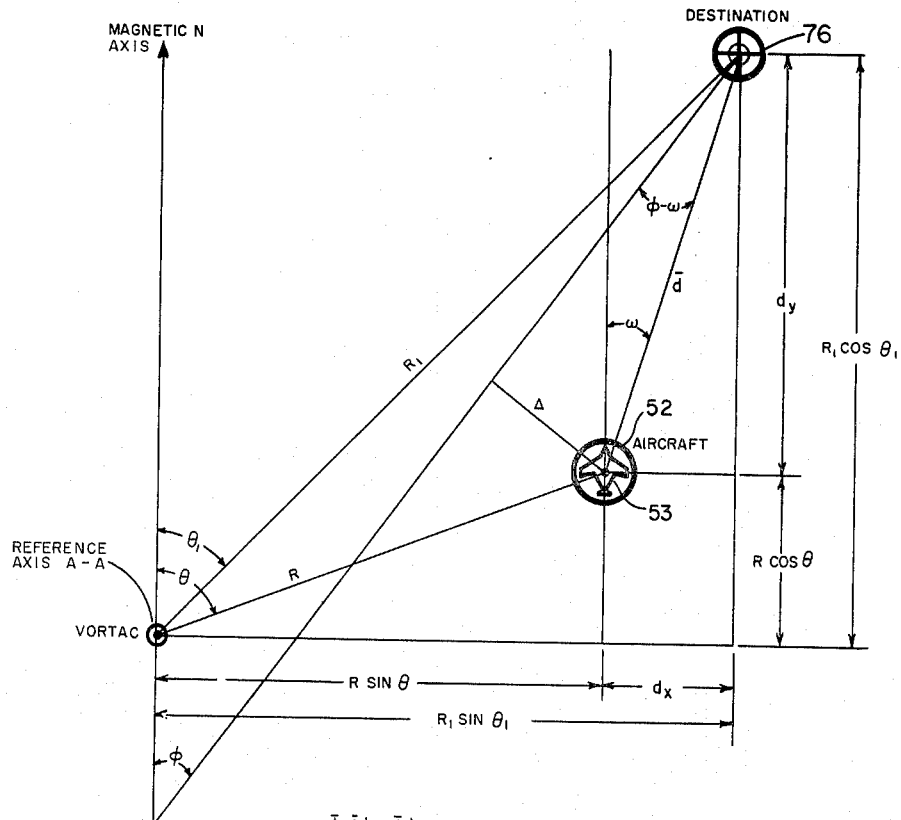
FIGURE 4 is a vector diagram showing the trigonometric relations involved in the problem solved by the course line computer of the present invention.

The geometric representation of the problem to be resolved in the computer is shown in FIGURE 4. The map representation of the VORTAC station is at the central reference axis A—A of the Display and Magnetic North Axis is perpendicular to reference axis A—A and "UP" on the map. The four parameters supplied to the computer are Magnetic Bearing $\theta$ from VORTAC Station to the aircraft which is obtained from the OBI, Range R from VORTAC Station to the aircraft which is obtained from the DME, Magnetic Bearing $\theta_1$ from the VORTAC station to the destination which is automatically obtained as shaft position when the bearing destination set 247 cranks the destination marker 76 over the desired location on the scale map of the area over which the aircraft is flying or cranks the known Bearing into bearing counter 246. Similarly range $R_1$ from VORTAC station to the destination is obtained by converting the position of the arm of destination distance potentiometer 244 to voltage, the arm being geared to distance destination set 248. The distance signal R from the aircraft's DME receiver and the distance signal $R_1$ reflected by the position of the arm of potentiometer 244 are both scaled down by gearing and the circuitry of scale switch 202 and their respective potentiometers to be compatible with the particular map scale impressed over actuators 59 and each other. Similarly so long as the map is to scale and aircraft marker 52 and destination marker 76 are properly positioned at the map representations of the actual aircraft position and desired destination position, the bearing angles $\theta$ and $\theta_1$ are also compatible with the map.

The course line computer solves the problem of distance $\bar{d}$ of the destination from the aircraft, the bearing $w$ of the destination from the aircraft, and indicates the offset error $\Delta$, or the angular error $\phi - w$ from the desired course $\phi$. The solution $\bar{d} = \bar{i}dx + \bar{j}dy = \bar{i}(R_1 \sin \theta_1 - R \sin \theta) + \bar{j}(R_1 \cos \theta_1 - R \cos \theta)$ is obtained by solving the trigonometric relationship indicated in FIGURE 4 as shown thereon.

Remote shaft 19 is coupled to the rotor shaft of resolver 215 to rotate the rotor windings of resolver 215 to a position $\theta$. A signal representative of range R is applied to the rotor windings of resolver 215 from potentiometer arm 104 through booster amplifier 214. Booster amplifier 214 isolates and raises the R signal to a proper level. A signal $R \cos \theta$ is taken from one stator winding of resolver 215 and a signal $R \sin \theta$ from the other stator winding.

A signal representative of $R_1$ is applied through booster amplifier 235 from the arm 243 of destination distance potentiometer 244 to a rotor winding of resolver 216. The rotor of resolver 216 is rotated to a position $\theta_1$ by coupling to the shaft of bearing destination set 247. A signal representative of $R_1 \cos \theta_1$ is taken off one stator winding of resolver 216 and $R_1 \sin \theta_1$ is taken off the other stator winding.

Signal $R \cos \theta$ is subtracted from Signal $R_1 \cos \theta_1$, and the difference is applied through booster amplifier 217 to one stator winding of resolver 219. Signal $R \sin \theta$ is subtracted from Signal $R_1 \sin \theta_1$, and the difference is applied through booster amplifier 218 to the other stator winding of resolver 219. The resultant stator field is therefore $\bar{i}(R_1 \sin \theta_1 - R \sin \theta) + \bar{j}(R_1 \cos \theta_1 - R \cos \theta)$ which reference to FIGURE 4 will show is exactly equal to the distance to destination $\bar{d}$. The rotor shaft 224 of resolver 219 is coupled to servo motor 230 and one rotor winding 221 is connected through AGC potentiometer 222 to servo amplifier 228 which in turn drives servo motor 230. This rotor winding acts like the rotor of a control transformer and in combination with servo amplifier 228 and servo motor 230 drives the rotor of resolver 219 through an angle δ until the signal on rotor winding 221 nulls. This occurs when rotor winding 221 is at right angles to the resultant stator field which means that the other quadrature wound rotor winding 223 is aligned with the resultant stator field and therefore the induced voltage in rotor winding 223 is proportional to the amplitude of the resultant stator field and equal to $\bar{d}$, the distance from the aircraft to destination. The angle δ between the zero axis of the resolver which represents Magnetic North, and the rotor will approach $w$, the Bearing to destination as rotor winding 223 becomes aligned with the stator field.

The output from rotor winding 223 shown as $d \cos(w-\delta)$ which approaches $d$ as δ approaches $w$ is connected to one input of servo amplifier 225 and is nulled against the signal obtained from the arm of distance to destination follow-up potentiometer 227. Rotor winding 223, servo amplifier 225, servo motor 226, and distance to destination potentiometer 227 form a conventional servo system. Servo motor 226 drives the arms of distance to destination follow-up potentiometer 227, AGC potentiometer 222, and deviation distance potentiometer 233 as well as synchro generators 220, and digital counters 232.

AGC potentiometer 222 is used to connect the output of rotor winding 221 of resolver 219 to servo amplifier 228 to maintain a relatively constant signal gradient to the bearing to destination servo over a large range of signal levels from rotor winding 221.

Magnetic damping 229 is provided to eliminate hunting of servo motor 230.

Synchro generators 220 are geared together to read miles to go to destination in units, tens and hundreds of nautical miles. The outputs of these synchro generators are fed to the corresponding synchro in the DME indicator not shown.

When contactor set 156 of junction box 155 is in the display operating condition, the Bearing-Heading information from the rotor windings 124 of OBI 122 has been removed from synchro input 161 driving the double barred pointer 164 of RMI 160. Differential generator 173 shown in both FIGURES 2B and 3 has Heading information applied to its stator windings 172 from compass output 167 through contactor set 156 and Bearing to destination information $w$ applied to its rotor shaft 170 from Bearing to destination servo motor 230. The output of the rotor windings 171 of differential generator 173 carrying $w$-Heading information is now connected through contactors 156 of junction box 155 to the input 161 of the synchro system driving the double barred pointer 164 of RMI 160. Since the servo motor input 162 driving azimuth card 163 of RMI 160 still carries Heading information from compass 166, the double barred pointer will now point to bearing to destination $w$ on azimuth card 163.

When contactor set 154 of junction box 155 is in the Display operating condition, demodulators 120 and 117 are disconnected from rotor coils 142 and 143 of OBS 144 and 26 volt 400 cycle voltage is connected to the rotor coils. The stator coils 145 and 146 of OBS 144 are similarly disconnected from the stator coils 111 and 112 of resolver 110 and are connected through contactor set 153 of junction box 155 to stator coils 187 and 188 respectively of resolver 190. Rectified reference current passes out of demodulator 184 over connector 186 through rotor coil 189 of resolver 190 to ground through "To-From" coil 152 over a contactor of contactor set 154 of junction box 155 and back over connector 185 to demodulator 184 to complete the circuit. Similarly rectified reference current passes out of demodulator 180 over connector 181, through a contactor of contactor set 154 through deviation indicator coil 149 of Deviation Indicator 147 to ground connection 139, through rotor winding 191 of resolver 190 and back through demodulator 180 over connector 182 to complete the circuit. The rotor shaft 192 of resolver 190 is coupled to the shaft of bearing to destination servo motor 230 and therefore the rotor of resolver 190 is oriented at an angle $w$ representative of the aircraft's bearing to destination with respect to the zero axis. The stator windings 187 and 188 of resolver 190 now set up a resultant space field representative of the desired course $\phi$ which has been obtained from the stator windings 145 and 146 of OBS 144 when the course $\phi$ was manually set in on OBS rotor shaft 141. Since the rotor shaft 192 of resolver 190 has been rotated through angle $w$ with respect to electrical zero representative of the Magnetic North axis, the rotor windings 189 and 191 of resolver 190 now have a signal impressed on them representative of $\phi-w$ or the deviation of the aircraft's Bearing to the destination $w$ from the desired course $\phi$.

If the bearing to the destination $w$ coincides with the selected course, the output of rotor winding 191 which feeds the deviation indicator demodulator 180 is zero, and the deviation indicator needle 148 remains centered. The second rotor winding 189 is then in phase with the stator field, and its output is a fixed voltage which is fed to the "To-From" demodulator 184. The output of this demodulator 184 will differ in phase by 180 degrees, depending upon the position of the "To-From" switch on the OBS which is not shown in Course Selector Indicator 140. For deviations in $w$ from the selected course $\phi$, the output of the Deviation Indicator 147 will read the sine of the deviation angle $\phi-w$, as rotor winding 191 of resolver 190 reads the sine of the resultant field. However, for angles up to 10 degrees the sine of the angle is approximately equal to the angle in radians. Similarly the output of the "To-From" rotor winding 189 of resolver 190 is equal to the cosine of the deviation angle, which for angles up to 10 degrees is virtually equal to unity.

Warning flag relay 212 shown in FIGURE 3 is deenergized to show "OFF" as in FIGURE 7A whenever there is a loss of power to the instrument. When power is applied and signals are received normally, servo amplifiers 211 and 204 have null outputs and the flag is rotated so that the legend "OFF" is out of sight and a white area appears in the window. The circuitry composing the warning flag relay block 212 of FIGURE 3 is shown in FIGURE 4 of application Serial No. 57,536 and described therein except that a red striped surface is used in place of "OFF" to indicate a malfunction.

It should be understood from following the description of the computer circuitry that the specific embodiment necessarily shows an input connected to either the rotor or stator windings of a resolver and the output taken from the other windings. However, in most cases the connection of input or output to either rotor or stator is merely a matter of choice and not intended to limit the scope of the invention.

Figure 6:
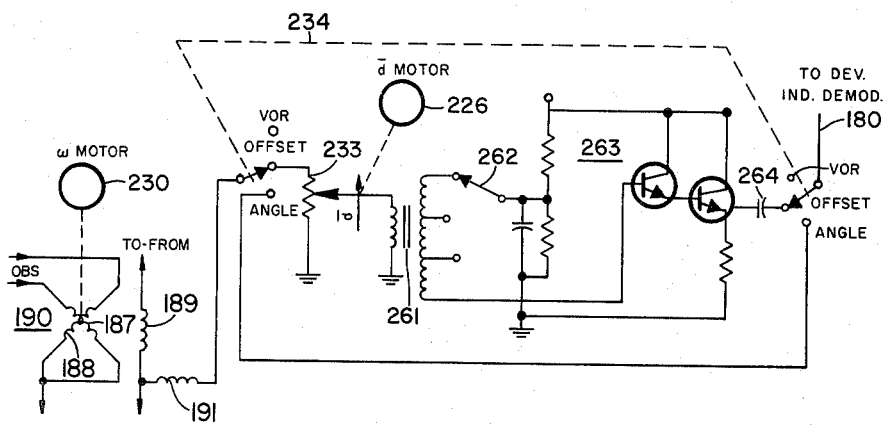
FIGURE 6 is an electrical schematic diagram illustrating the circuitry of the computed offset mode of the course line computer of FIGURE 3.

Three modes of operation of the Deviation Indicator 147 may be selected by deviation indicator switch 234 shown on the front panel in FIGURE 7A and schematically in FIGURE 6. They are computed angle, computed offset and VOR radial.

The VOR radial mode is used should the pilot wish to fly a normal VOR radial, either inbound or outbound, thereby obviating the manual repositioning of the destination marker 76 to coincide with the VORTAC reference station. The pictorial display will continue to operate normally, showing the aircraft's location over the map. In addition, the DME indicator and the RMI 160 will continue to read distance and Bearing of the aircraft to the VORTAC station while the destination indicators 246 and 249 will read bearing and distance to the preset destination.

Figure 5:
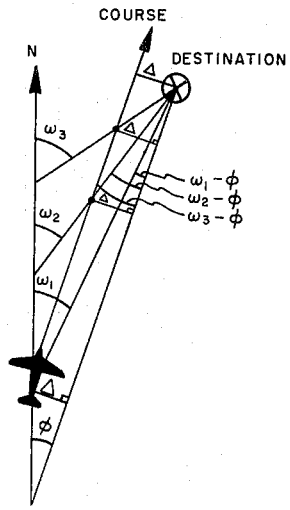
FIGURE 5 is a vector diagram illustrating the trigonometric relationships involved in the computed deviation angle and computed offset modes of operation of the course line computer of FIGURE 3.

FIGURE 5 illustrates the problem in the computed offset mode. As the aircraft flies a course parallel to the desired one but offset by a fixed amount, the deviation angle ($w-\phi$) increases as the plane approaches the destination. This will give a very large deflection of the deviation indicator as the plane approaches the destination and the needle may go to the limit of its travel before the aircraft has completed its travel on that parallel course so that the reading is meaningless.

FIGURE 6 shows detailed circuitry composing the deviation distance potentiometer block 233 of FIGURE 3. In FIGURE 6, deviation indicator switch 234 is shown as double pole, double throw whereas in FIGURE 3 it is shown as a single pole, double throw switch. Examination will show that in both cases, when thrown to the "angle" position, it connects resolver rotor coil 191 directly to the deviation indicator demodulator 180 to give the results described heretofore while in the offset mode, it throws the circuitry of FIGURE 6 between rotor winding 191 and deviation indicator demodulator 180.

With deviation indicator switch 234 in the offset position of FIGURE 6, rotor coil 191 of resolver 190 which is the sine of the deviation angle coil is connected across potentiometer 233. As the aircraft approaches the destination, the deviation angle $w-\phi$ shown in FIGURE 5 and accordingly sine ($w-\phi$) increases as explained for FIGURE 5 so that the voltage across potentiometer 233 likewise continues to increase. However, distance to destination servo motor 226 is connected to the movable arm of potentiometer 233 to drive the arm toward ground as the aircraft approaches the destination. Therefore, the increased output of sine coil 191 of resolver 190 caused by this increased angular displacement will be offset by the greater attenuation introduced by the arm of potentiometer 233. The deflection signal is coupled through isolating transformer 261 to the input of booster amplifier 263 through switch 262 and the output is coupled through capacitor 264 to the deviation indicator demodulator 180 and deviation indicator 147. In this manner, a constant distance offset Δ, as shown in FIGURE 5 will give a constant deflection of deviation indicator needle 148, regardless of the distance of the aircraft from the destination. The booster amplifier 263 in the present embodiment has a gain of 1 and provides isolation between the demodulator and the course-width selecting network. Taps on the secondary of transformer 261 set the sensitivity of the system so that in the present embodiment full deflection of the deviation indicator 147 corresponds to either 3, 6 or 10 miles of offset.

Actually the offset mode is an alternative method of using the deviation indicator to give a constant needle sensitivity when flying a constant offset. The normal method of flying an offset course parallel to the predetermined course would be by positioning the destination marker 76 at the desired offset distance from the actual destination on the map or by use of the destination counters 246 and 249. The course angles $\phi$ and $w$ being equal, the pilot would fly to the offset destination with the deviation needle 148 zeroed.

FIGURE 7A shows the panel face of the case containing the embodiment of the present invention. Intensity switch 266 regulates the illumination of the display to suit the operating conditions. The bearing and distance counters 246 and 249 give a numerical indication of the position of the destination marker 76 set into the computer by bearing and destination sets 247 and 248 respectively. Warning flag 212 indicates by the "OFF" that the instrument readings are not operating properly. Connector 265 shown in FIGURE 7B connects the instrument circuitry to junction box 155. The operation of the display portion of the present invention has been described in application Serial No. 95,139 and the computer portion of the invention was described above.

It should be understood that a specific embodiment of the present invention has been described using specific terms and examples but using them in a generic and descriptive sense and not for the purposes of limitation, as the scope of the invention is set forth in the following claims:

What is claimed is:

1. A navigational display and computer for providing a continuous indication of the distance $d$ of a vehicle from a destination including:
   (a) means for receiving signals representative of vehicle's distance R and angular position $\theta$, and destination distance $R_1$ and angular position $\theta_1$ and for resolving the vehicle and destination positions on a system of reference coordinate axes;
   (b) means for subtracting corresponding components of the position of the vehicle from the position of the destination as resolved along each axis of the coordinate system;
   (c) a first pair of quadrature wound stator and a first pair of quadrature wound displaceable rotor means for receiving each resolved component difference output of the subtracting means on one winding of one pair of said wound means producing a resultant first space vector field representative of the distance $d$ thereby inducing output signals proportional to the product of $d$ and the sine and cosine of the rotor displacement angle in the other pair of said wound means;
   (d) servo means energized by the sine output winding of said other pair of wound means for displacing the rotor relative to the first vector field until said energizing output nulls thereby producing an output on the cosine winding representative of the distance $d$; and
   (e) display means responsive to said signals representative of R, $\theta$, $R_1$ and $\theta_1$ for indicating the position of the vehicle and its destination.

2. A navigational display and computer according to claim 1 further including indicating means responsive to the output of said distance indicating winding for indicating the distance $d$ of the vehicle from its destination.

3. A navigational display and computer for providing a continuous indication of the distance $d$ of a vehicle from a destination including:
   (a) means for receiving signals representative of vehicle's distance R and angular position $\theta$, and destination distance $R_1$ and angular position $\theta_1$ and for resolving the vehicle and destination positions on a system of reference coordinate axes;
   (b) means for subtracting corresponding components of the position of the vehicle from the position of the destination as resolved along each axis of the coordinate system;
   (c) a first pair of quadrature wound stator and a first pair of quadrature wound displaceable rotor means for receiving each resolved component difference output of the subtracting means on one winding of one pair of said wound means producing a resultant first space vector field representative of the distance $d$ thereby inducing output signals proportional to the product of $d$ and the sine and cosine of the rotor displacement angle in the other pair of said wound means;
   (d) servo means energized by the sine output winding of said other pair of wound means for displacing the rotor relative to the first vector field until said energizing output nulls thereby producing an output on the cosine winding representative of the distance $d$; and
   (e) means for obtaining the deviation of the vehicle from a predetermined course, said means including means for obtaining a second space vector field oriented at an angle representative of said predetermined course and additional means for subtracting the angle of displacement of said rotor means representative of the vehicle's present course from the angle of said second space field.

4. The combination according to claim 3 in which the deviation means includes resolving means having input and output pairs of quadrature windings for receiving and reproducing the second field with the input pair of windings and for displacing the input from the output pairs of windings by the displacement of the first rotor means thereby providing as a first output a signal proportional to the sine of the difference between course angle and rotor angle representative of the magnitude of deviation from the predetermined course and as a second output a signal proportional to the cosine of said difference representative of the direction of said deviation.

5. The combination according to claim 3 including means inversely responsive to distance signal $d$ connected to the deviation obtaining means for attenuating the deviation indication to produce a constant signal when the vehicle is following an offset present course parallel to the predetermined course.

6. The combination according to claim 5 in which the attenuating means is a potentiometer.

7. The combination according to claim 5 further including means coupled to the attenuating means for producing the constant signal with different offsets from the predetermined course.

8. The combination according to claim 7 in which the means for producing a constant signal with different offsets is a tapped transformer.

9. A navigation instrument for a vehicle comprising:
 (a) a reference frame having a reference axis corresponding to the location of a reference station disposed so that the area contiguous to said reference axis corresponds to the contiguous area around said reference station;
 (b) a vehicle marker movable relative to the frame to indicate vehicle position and rotatable about a heading axis through said marker to indicate vehicle heading;
 (c) vehicle marker positioning means for moving the vehicle marker radially relative to the reference axis a distance corresponding to the vehicle range R relative to the reference station, and in azimuth about said reference axis through an angle relative to a reference direction corresponding to the vehicle bearing $\theta$ relative to the reference station and for rotating the vehicle marker about the heading axis through an angle relative to the reference direction corresponding to the vehicle heading;
 (d) a movable destination marker for indicating vehicle destination; and
 (e) destination marker positioning means for positioning the destination marker within the confines of the display area radially at a distance from the reference axis corresponding to the destination distance $R_1$ relative to the reference station and through an angle about said reference axis and relative to the reference direction corresponding to the destination bearing $\theta_1$ relative to the reference station.

10. A navigation instrument according to claim 9 further including a course line computer comprising:
 (a) differential resolver means for receiving signals $\theta$, $\theta_1$, R, and $R_1$ on its input and for producing a signal $R_1 \cos \theta_1 - R \cos \theta$ as a first output and $$R_1 \sin \theta_1 - R \sin \theta$$

as a second output;
 (b) a second resolving means having a rotor and first and second input windings for receiving the first and second outputs of the differential resolver means and having a first output winding wherein is induced a signal representative of $d$ multiplied by the sine of the rotor displacement and a second output winding wherein is induced a signal representative of $d$ multiplied by the cosine of said displacement, where $d$ is the distance of the vehicle from the destination; and
 (c) servo motor means for receiving the first output winding signal of the second resolving means and for driving said rotor till said first output signal nulls thereby rendering the second output winding signal proportional to $d$ when said rotor displacement represents vehicle course.

11. A navigation instrument for an aircraft having radio receiving means for supplying directional and range information relative to a reference station to which it is tuned and compass means for supplying heading information comprising:
 (a) a frame having an axis corresponding to the location of a reference station;
 (b) a movable aircraft marker indicative of aircraft position;
 (c) a marker wheel attached to said aircraft marker;
 (d) aircraft marker positioning means on the frame; and including
  (d1) a first plate movable in angular position about said axis,
  (d2) a first servo means for driving the first plate about the axis,
  (d3) a first endless belt to which the aircraft marker is rotatably attached,
  (d4) means including a first driving wheel and two pulleys for mounting the first belt on said first plate for movement of said first belt and aircraft marker along a radial line from the axis,
  (d5) a second servo means for driving the first driving wheel and first belt along said radial line,
  (d6) a second endless belt,
  (d7) means including a second driving wheel and two pulleys for mounting the second belt on the first plate and disposed for movement of said second belt relative to said marker wheel for rotating the aircraft marker,
  (d8) a third servo means for driving the second driving wheel and moving the second belt;
 (e) first connecting means for applying the directional information to the first servo means so that the first plate is driven by said first servo means to an angular position about the axis which corresponds to the aircraft direction relative to the reference station;
 (f) second connecting means for applying the range information to the second servo means so that the second servo means drives the first belt and aircraft marker a distance from the axis corresponding to the aircraft range relative to the reference station;
 (g) a map indexing plate on the frame, said plate having an aperture concentric with the axis and disposed so that the area around said axis corresponds to the adjacent area around a reference station;
 (h) third connecting means for applying the heading information to the third servo means so that said third servo means drives the second belt and rotates the aircraft marker to a direction with respect to the map plate corresponding to the aircraft heading;
 (i) a movable destination marker indicative of a desired destination mounted on said frame; and,
 (j) means for positioning the destination marker.

12. A navigation instrument according to claim 11 wherein said means for positioning the destination marker comprises:
 (a) a first transparent gear disposed within the top of the map plate aperture for rotation about said axis,
 (b) a fourth servo means for driving said first gear about said axis,
 (c) an endless loop to which the destination marker is attached,
 (d) means including a plurality of guides disposed for mounting said loop on said first gear and for movement of the destination marker along a radial line from the axis, (e) a second transparent gear disposed above and concentric with the first gear within the top of the map plate aperture for rotation about said axis, (f) means connecting an off-center point of the second gear to the loop for radial motion of the destination marker responsive to rotation of said second transparent gear, (g) a fifth servo means for driving the second gear and thereby the loop, (h) control means for setting the bearing of a desired destination into the fourth servo means for driving the first gear and the destination marker to an angular position about the axis corresponding to the bearing of said destination relative to said reference station; and, (i) control means for setting the distance of a desired destination into the fifth servo means thereby driving the second gear and the loop so that the destination marker moves a distance from the axis corresponding to the distance of said destination relative to said reference station.

13. A navigation instrument according to claim 12 further including course navigating means including a plate marked with a series of course lines rotatably mounted adjacent to said map.

14. A navigational instrument according to claim 12 in which the directional information to the aircraft is represented by the angle $\theta$ from a reference direction through the reference station, range to the aircraft is represented by the distance R from said reference station, bearing to destination is represented by the angle $\theta_1$, from said reference direction, and range to destination is represented by the distance $R_1$, from said reference station, and which further includes a course line computer for providing a continuous indication of the distance $d$ of the aircraft from its destination comprising:

(a) a first resolving means having an input winding for receiving a signal representing R and a rotor shaft driven by a signal representing $\theta$ for resolving said signals into a first output $R \cos \theta$ and a second output $R \sin \theta$;

(b) a second resolving means having an input winding for receiving a signal representing $R_1$ and a rotor shaft driven by a signal representing $\theta_1$ for resolving said signals into a first output $R_1 \cos \theta_1$ and a second output $R_1 \sin \theta_1$;

(c) a first subtracting means for subtracting the first resolving means first output from the second resolving means first output to produce a signal $R_1 \cos \theta_1 - R \cos \theta$;

(d) a second subtracting means for subtracting the first resolving means second output from the second resolving means second output to produce a signal $R_1 \sin \theta_1 - R \sin \theta$;

(e) a third resolving means having two input windings and two output windings and a rotor shaft and receiving the $R_1 \cos \theta_1 - R \cos \theta$ signal on a first input winding and the $R_1 \sin \theta_1 - R \sin \theta$ signal on the second input winding thereby producing a resultant vector space field $i(R_1 \sin \theta_1 - R \sin \theta) + j(R_1 \cos \theta_1 - R \cos \theta)$ representative of $d$ and inducing in the first output winding a signal representative of the product of $d$ and the cosine of the shaft angular displacement and in the second output winding a signal representative of the product of $d$ and the sine of said displacement;

(f) means responsive to the first output of the third resolving means to drive the rotor thereof and null said first output thereby rendering the second output proportional to $d$ and the rotor displacement equal to $w$, the aircraft bearing to the destination.

15. The combination according to claim 14 further including indicating means for receiving the second output of the third resolving means and indicating the distance $d$.

16. The combination according to claim 14 in which the course line computer further comprises means for producing a continuous indication of the direction and magnitude of any deviation of the aircraft from a predetermined course of bearing $\phi$ from the reference direction to the destination.

17. The combination according to claim 14 in which the course line computer further includes means for producing a constant indication on said deviation indicating means when flying a course parallel to but offset by a constant amount from the predetermined course $\phi$.

18. The combination according to claim 17 further including scale switching means coupled between the deviation potentiometer arm and the deviation indicator and means for varying the output signal from the deviation distance potentiometer arm in proportion to a desired offset to cause full scale deflection of said deviation indicator means.

19. A navigational display and computer for providing a continuous indication of the distance $d$ of a vehicle from a destination comprising:

(a) differential resolver means for receiving signals on its input representative of vehicle's azimuth position $\theta$ and destination azimuth position $\theta_1$ and vehicle's range R and destination range $R_1$ from a reference station and for producing a signal $R_1 \cos \theta_1 - R \cos \theta$ as a first output and $R_1 \sin \theta_1 - R \sin \theta$ as a second output;

(b) a sine-cosine resolving means having a rotor and a first and second input winding for receiving the first and second outputs of the differential resolver means to generate a resultant field representative of $d$ and having output windings wherein are induced signals representative of the resolved sine and cosine components of $d$;

(c) servo means for receiving the output of the sine output winding and for driving the rotor of the sine-cosine resolving means till the output of said sine output winding nulls thereby producing an output proportional to $d$ on said cosine output winding;

(d) means responsive to the output of the cosine output winding for indicating the distance $d$;

(e) and display means responsive to said signals representative of R, $\theta$, $R_1$ and $\theta_1$ for indicating the position of the vehicle and its destination.

20. The combination according to claim 9 further including computer means responsive to signals representative of $\theta$, $\theta_1$, R, and $R_1$ for computing the distance $d$ between the vehicle and the destination.

21. The combination according to claim 9 further including computer means responsive to signals representative of $\theta$, $\theta_1$, R, and $R_1$ for computing the bearing W of the vehicle's course to the destination.

22. Navigational equipment for use with an aircraft's flight instruments comprising:

(a) a reference frame with a reference direction corresponding to a standard direction and a reference axis corresponding to a reference station;

(b) an aircraft marker and a destination marker representative of said aircraft and a destination respectively;

(c) marker positioning means for translating the aircraft and destination markers radially from the reference axis by distances corresponding to the respective ranges of the aircraft and destination from the reference station, and for orbiting said markers through angles about the reference axis relative to the reference direction corresponding to the respective bearings of said aircraft and destination relative to the reference station; and (d) switching means for connecting bearing and range information from the flight instruments to actuate the marker positioning means.

23. The combination according to claim 22 in which the marker positioning means further provides for orienting the aircraft marker in a direction corresponding to aircraft heading and means for supplying heading information to said positioning means.

24. The combination according to claim 22 further including computer means responsive to signals representative of aircraft and destination bearings and ranges relative to the reference station for computing the aircraft's course to the destination.

25. A navigation instrument for a vehicle comprising:
(a) a reference frame having a reference direction corresponding to a standard direction and a reference axis corresponding to a reference station, said frame being so disposed that the frame space contiguous to said reference axis corresponds to the actual space contiguous to said reference station;
(b) instrument markers representative of the vehicle and a destination and movable relative to said frame space; and
(c) marker positioning means for displacing the vehicle and destination markers radially from the reference axis by amounts corresponding to the respective ranges of the vehicle and destination from the reference station and for orbiting said markers about said reference axis through angles relative to the reference direction corresponding to the respective angular positions of the vehicle and destination relative to the reference station.

26. The combination according to claim 25 in which the marker positioning means further provides for turning the vehicle marker to orient it in a direction corresponding to the vehicle's heading.

27. The combination according to claim 25 further including computer means responsive to signals representative of vehicle and destination angular positions and ranges relative to the reference station for computing information relative to said vehicle's course to said destination.

References Cited by the Examiner
UNITED STATES PATENTS
3,090,958   5/63   Brown _____ 235—189 X MALCOLM A. MORRISON, *Primary Examiner.*